Dec. 8, 1925.
W. H. KELLY
PRESSURE GAUGE
Filed March 27, 1925
1,564,246
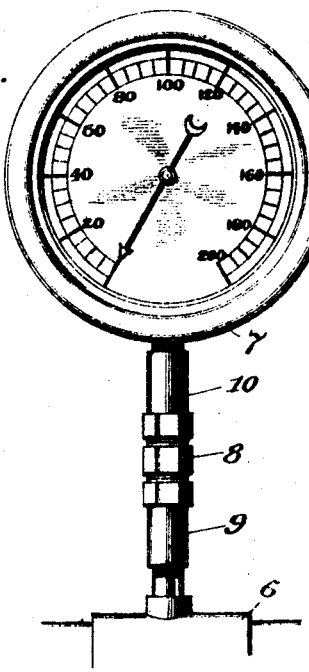
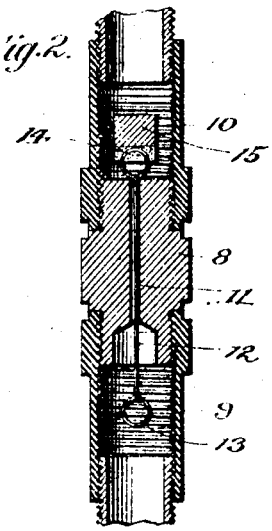 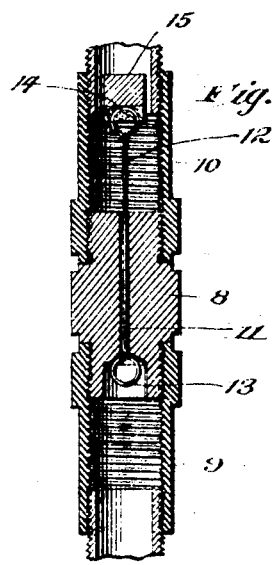
Inventor
William Hardy Kelly
by Dodge & Sons
Attorneys Patented Dec. 8, 1925.

1,564,246

UNITED STATES PATENT OFFICE.

WILLIAM HARDY KELLY, OF CHARLOTTE, NORTH CAROLINA.

PRESSURE GAUGE.

Application filed March 27, 1925. Serial No. 18,815.

*To all whom it may concern:*

Be it known that I, WILLIAM HARDY KELLY, a citizen of the United States, residing at Charlotte, in the county of Mecklenburg and State of North Carolina, have invented certain new and useful Improvements in Pressure Gauges, of which the following is a specification.

This invention relates to pressure gauges and particularly to means for causing the gauge to give a steady reading and to reduce the wear on the gauge occasioned by momentary fluctuations of pressure.

Where a pressure gauge is used on a line, such, for example, as a water supply line, there are often minor pressure fluctuations of short duration which cannot be effectively read, which are of on substantial importance, and which occasion serious wear on the moving parts of the gauge. The effect of these fluctuations can be minimized by interposing a throttling constriction between the gauge and the line. To be effective, however, such a constriction must be quite small, and for that reason the use of a throttling constriction of ordinary type is not permissible because it is likely to become clogged and thus cause the gauge to give a false reading. By the present invention I provide a constriction which is free from the objection just mentioned.

Stated in general terms, I make use of an orifice of substantial size and then reduce the effective area of this orifice by means of a clearing wire which is so arranged as to move a short distance back and forth through the orifice when there are substantial fluctuations of pressure. There are a number of advantages secured by this arrangement. It is easier and less expensive to drill a larger hole. It is possible to vary the effective area of the orifice by substituting clearing wires of different diameter. Finally, the transverse dimension of an annular port is far less than the transverse dimension of a circular port of the same area, and consequently the annular port offers less opportunity for the entrance of scale and similar particles likely to clog the orifice.

Obviously the amount of fluid which flows to and from a gauge under fluctuations of pressure is relatively small. Since the movement of the clearing wire must be caused by this flow of liquid, it is important to provide means for moving the wire which will respond to the flow of a small quantity of liquid. To secure the desired result I weight the wire so that it normally seeks a low position. I attach to the clearing wire a weighted head which, in such low position of the clearing wire, is so near the upper end of the restricted port that it is readily lifted by the flow of fluid to the gauge even when this flow of fluid is of relatively small quantity.

The preferred embodiment of the device is illustrated in the accompanying drawings, in which—

Fig. 1 is a front elevation of a gauge attached to a pressure line with my invention applied in the form of a fitting inserted between the gauge and the pressure line;

Fig. 2 is a vertical section of the fitting on an enlarged scale, showing the clearing wire in its lowermost position; and Fig. 3 is a similar section showing the clearing wire in its uppermost position.

In Fig. 1 the pressure line is indicated at 6 and a gauge of ordinary construction at 7. Interposed between the pressure line 6 and the gauge 7 is a fitting made up of a body portion 8 and two threaded sleeves or couplings 9 and 10 which last serve as means for connecting the body 8 with nipples on the pipe 6 and gauge 7. The body 8 is provided with a longitudinal port or passage 11 of relatively small diameter and the effective area of this passage is reduced by means of a clearing wire 12 which is smaller and longer than the port 11 so as to be capable of sliding longitudinally through the same.

Upward motion of the wire 12 is limited by a loop 13 and downward motion is similarly limited by a loop 14. These loops are in effect limit stops controlling the movement of the wire 12. Mounted on the upper loop 14 is a combined weight and lifting vane 15. The weight of the member 15 normally urges the wire 12 to its lowermost position, and in such lowermost position the member 15 is spaced slightly above the upper end of the port 11. Thus when liquid flows toward the valve, as it will on any sustained pressure increase, the member 15 is carried upward a greater or less distance by the flow of liquid, drawing the wire 12 through the orifice 11 and clearing the same. In cases of marked changes of pressure the wire 12 may be drawn to its extreme uppermost position, shown in Fig. 3, though it commonly does not move so far.

It will be observed that the member 15 partially obstructs the coupling 10, so that there is an annular, somewhat constricted passage around it. This passage is reduced near the upper limit of motion of the member 15 by the entrance of this member into the end of the connected nipple, so that near the end of the upward movement, when the member 15 is far away from the port 11, there may be still a tendency to lift the member 15 and ensure full travel of the wire 12.

The operation of the device will be readily understood. The constriction interposed between the gauge and the pressure line throttles the flow to and from the gauge and hence damps out any but considerable or sustained pressure fluctuations. The clearing wire not only prevents the entrance of clogging particles into the port 11, but it also tends to clear the port by moving alternately through it. While I prefer to return the wire to its normal position by means of gravity, it is obvious that the vane action of the member 15, under alternate flow back and forth, would have the effect of moving the clearing wire independently of the action of gravity.

While I prefer the construction illustrated in the drawings as simple and inexpensive, obviously various changes might be made within the scope of the invention, and I do not imply any limitations beyond those expressed in my claims. While I show the fitting mounted very close to the gauge as a simple way of illustrating the invention, this is not essential provided the constriction be interposed between the main pressure line and the gauge in such manner that it restricts the flow of pressure fluid to and from the gauge under fluctuations of main line pressure. Successful installations have been made where the fitting with its constriction is located at a considerable distance, for example about twenty-five feet from the gauge.

What is claimed is:

1. The combination of a pressure gauge; a connection for said gauge having a constriction throttling the flow of fluid under pressure to and from the gauge; and a movable clearing stem within said constriction and arranged to be moved by the flow of fluid therethrough.

2. The combination of a pressure gauge; a connection for said gauge having a constriction throttling the flow of fluid under pressure to and from the gauge; a clearing stem mounted for limited motion within said constriction and arranged to be moved by gravity to one limit of such motion; and a vane connected with said stem and arranged to be near said constriction and in the path of flow to and from the same when said stem is at such limit of motion.

3. The combination of a pressure gauge; a connection for said gauge having a constriction throttling the flow of fluid under pressure to and from the gauge; a clearing stem mounted for limited motion within said constriction; and a combined weight and vane carried by said stem in the path of fluid flowing to and from said constriction.

4. The combination of a pressure gauge; a connection for said gauge having a constriction throttling the flow of fluid under pressure to and from the gauge, said connection having adjacent said constriction an enlarged portion, and beyond said enlarged portion a reduced portion communicating therewith; a clearing stem mounted for limited motion through said constriction; and a vane connected with said stem, the parts being so constructed and arranged that in one limiting position of the stem the vane is adjacent the constriction, and in the other limiting position of the stem the vane is within said reduced portion.

In testimony whereof I have signed my name to this specification.

WILLIAM HARDY KELLY.